(12) United States Patent
Deluca et al.

(10) Patent No.: US 12,179,298 B2
(45) Date of Patent: Dec. 31, 2024

(54) IN SITU CRACK REPAIR IN STRUCTURES (71) Applicant: The Boeing Company, Arlington, VA (US)

(72) Inventors: Michael J. Deluca, Norristown, PA (US); Matthew H. Cawthorne, Wayne, PA (US); Howard T. Rolleston, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/521,150

(22) Filed: Nov. 28, 2023

(65) Prior Publication Data

US 2024/0091891 A1   Mar. 21, 2024

Related U.S. Application Data

(62) Division of application No. 17/677,036, filed on Feb. 22, 2022, now Pat. No. 11,865,656.

(60) Provisional application No. 63/211,818, filed on Jun. 17, 2021.

(51) Int. Cl.
*B29C 73/04*   (2006.01)
*B23K 20/00*   (2006.01)
*B23P 6/04*   (2006.01)

(52) U.S. Cl.
CPC .............. *B23P 6/04* (2013.01); *B23K 20/002* (2013.01); *B29C 73/04* (2013.01)

(58) Field of Classification Search
CPC ............. B23P 6/04; B29C 73/04; B29C 73/03
USPC .......................................................... 156/94
See application file for complete search history.

(56) References Cited

U.S. PATENT DOCUMENTS

6,561,247 B2   5/2003   Chou et al.
2014/0216634 A1   8/2014   Hanks et al.

*Primary Examiner* — Christopher T Schatz
(74) *Attorney, Agent, or Firm* — Quinn IP Law (57) ABSTRACT

A method for repairing a crack in a structure includes mounting a manifold to the structure around the crack. The structure has a nonplanar surface contour that surrounds the crack. The manifold has a base portion, a cover portion, and a plug. The base portion has a grip surface configured to conform to the nonplanar surface contour of the structure. The cover portion is connected to the base portion, and has an injection port and a vent port in fluid communication with a channel aligned to the crack. The injection port transfers a bonding material into and out of the channel. The plug closes and opens the vent port. The method includes filling the channel with the bonding material to direct the bonding material into the crack, and draining the bonding material from the manifold.

20 Claims, 9 Drawing Sheets

IN SITU CRACK REPAIR IN STRUCTURES

CROSS-REFERENCE TO RELATED APPLICATION

The present application claims the benefit of priority to U.S. Provisional Application No. 63/211,818 filed Jun. 17, 2021, and is a divisional of U.S. application Ser. No. 17/677,036 filed Feb. 22, 2022, which are hereby incorporated by reference in their entirety.

GOVERNMENT FUNDING

This invention was made with Government support under W58RGZ-14-D-0075 awarded by Department of Defense. The government has certain rights in this invention.

TECHNICAL FIELD

The disclosure relates generally to structural repairs, and in particular, to an apparatus and/or method for an in situ crack repair of structures.

BACKGROUND

Cracks sometime form in structures that undergo many fatigue cycles. Repairing the cracks may be problematic depending on the crack locations. Existing drill-and-fill style repair methods are sometimes undesirable where the cracks form in certain locations of the structures. The drill-and-fill style repairs often involve an extensive number of holes that may weaken the structures. Injecting resins into the cracks via syringes or adhesive cartridges also has limitations. Success of the injection style repairs depends on accurately establishing a location, a depth, and an overall propagation of the damage, which may be difficult to determine. Vacuum-assisted repairs are not well suited for irregular shapes and certain structures. In particular, surface roughness of the parts, internal honeycomb cores, and/or locations of an adjacent bolt hole with permanent hardware installed may prevent proper vacuum integrity from being established.

Accordingly, those skilled in the art continue with research and development efforts in the field of repairing cracks in composite structures and/or bonded metal structures in situ. As such, it would be desirable to have a method and an apparatus that takes into account at least some of the issues discussed above, as well as other possible issues.

SUMMARY

A method for repairing a crack in a structure is provided herein. The method includes mounting a manifold to the structure around the crack. The structure has a nonplanar surface contour that surrounds the crack. The manifold has a base portion, a cover portion, and a plug. The base portion has a grip surface configured to conform to the nonplanar surface contour of the structure that surrounds the crack. The base portion defines a channel. The channel is in fluid communication with the crack while the base portion is mounted to the structure. The cover portion is connected to the base portion and covers the channel. The cover portion has an injection port and a vent port that are in fluid communication with the channel. The injection port is configured to transfer a bonding material alternatively into the channel and out of the channel. The plug is configured to alternatively close and open the vent port. The method further includes filling the channel in the manifold with the bonding material to direct the bonding material into the crack, and draining the bonding material from the manifold through the injection port after the bonding material has filled the crack.

In one or more embodiments of the method, the structure is a composite structure or a bonded metal structure, and the nonplanar surface contour varies along each of three dimensions proximate the crack.

In one or more embodiments, the method includes warming an area of the structure around the crack prior to the filling of the channel with the bonding material.

In one or more embodiments of the method, the warming comprises applying an infrared light through the cover portion and around the base portion onto the structure.

In one or more embodiments, the method includes applying a mechanical load to the structure to open the crack, closing the vent port with the plug after the channel has been filled with the bonding material, and reducing the mechanical load on the structure to close the crack.

In one or more embodiments, the method includes pressurizing the bonding material in the channel to a first pressure while the crack is open.

In one or more embodiments, the method includes reducing the first pressure of the bonding material in the channel to a second pressure after the crack has closed.

In one or more embodiments, the method includes holding the bonding material in the channel at the second pressure while the bonding material cures.

In one or more embodiments, the method includes removing the second pressure from the bonding material in the channel, and opening the vent port after the second pressure has been removed.

In one or more embodiments, the method includes removing the manifold from the structure after the bonding material is drained from the channel.

In one or more embodiments, the method includes measuring the nonplanar surface contour of the structure that surrounds the crack.

In one or more embodiments, the method includes fabricating the grip surface of the base portion to match the nonplanar surface contour of the structure as measured.

In one or more embodiments, the method includes fabricating the cover portion on the base portion.

In one or more embodiments of the method, the repairing is performed while the structure remains in situ.

A repair system is provided herein. The repair system includes a rig, a manifold, and a container. The rig is configured to support a structure that has a crack. The structure has a nonplanar surface contour that surrounds the crack. The manifold is mountable to the structure around the crack. The manifold has a base portion, a cover portion, and a plug. The base portion has a grip surface configured to conform to the nonplanar surface contour of the structure that surrounds the crack. The base portion defines a channel. The channel is in fluid communication with the crack while the base portion is mounted to the structure. The cover portion is connected to the base portion and covers the channel. The cover portion has an injection port and a vent port that are in fluid communication with the channel. The injection port is configured to transfer a bonding material alternatively into the channel and out of the channel. The plug is configured to alternatively close and open the vent port. The container is in fluid communication with the injection port and configured to transfer the bonding material into the channel.

In one or more embodiments, the repair system includes a heater configured to warm an area of the structure around the crack prior to filling the channel with the bonding material.

In one or more embodiments of the repair system, a mechanical load is applied by the rig to the structure to open the crack. The channel in the manifold is filled with the bonding material while the crack is open. The mechanical load on the structure is reduced by the rig to close the crack after the bonding material has filled the channel. The bonding material is drained from the manifold through the injection port after the crack has been closed.

A manifold to repair a crack in a structure that has a nonplanar surface contour that surrounds the crack is provided herein. The manifold includes a base portion, a cover portion, and a plug. The base portion has a grip surface configured to conform to the nonplanar surface contour of the structure that surrounds the crack. The base portion defines a channel. The channel is in fluid communication with the crack while the base portion is mounted to the structure. The cover portion is connected to the base portion and covers the channel. The cover portion has an injection port and a vent port that are in fluid communication with the channel. The injection port is couplable to a container. The injection port is configured to transfer a bonding material alternatively into the channel from the container and out of the channel. The plug is configured to alternatively close and open the vent port.

In one or more embodiments of the manifold, the cover portion is transparent to visible light and infrared light.

In one or more embodiments of the manifold, the base portion is wider at the grip surface than at the cover portion.

The above features and advantages, and other features and advantages of the present disclosure are readily apparent from the following detailed description of the best modes for carrying out the disclosure when taken in connection with the accompanying drawings.

DETAILED DESCRIPTION

Embodiments of the present disclosure include a repair method and/or a repair system for composite structures and/or bonded metal structures comprising a flexible manifold configured according to a size and a shape of a crack (e.g., a composite fracture). The flexible manifold includes a base portion for adhesion to a surface of the structure, and a cover portion. The cover portion has an injection port for injecting a bonding material (e.g., a resin) into a cavity, and a vent port to enable air within the cavity to escape as the bonding material is introduced. The repair method includes optionally preheating the structure, placing and adhering the flexible manifold to the structure in a location that covers the crack, pulling a vacuum in the cavity and/or pressurizing the bonding material to bonding material into the crack, allowing the bonding material to cure, and removing the manifold. The repair method and the repair system may be utilized to fix damaged structures while the structures remain in situ (e.g., in normal places), or with the structures are moved to repair facilities. In some situation where the structures are part of larger machines (e.g., parts of aircraft or other vehicles), the structures may be repaired while attached to the machines. In other situations, the structures may be removed from the machines for repair and subsequently returned to the machines after the repairs have been completed.

Figure 1:
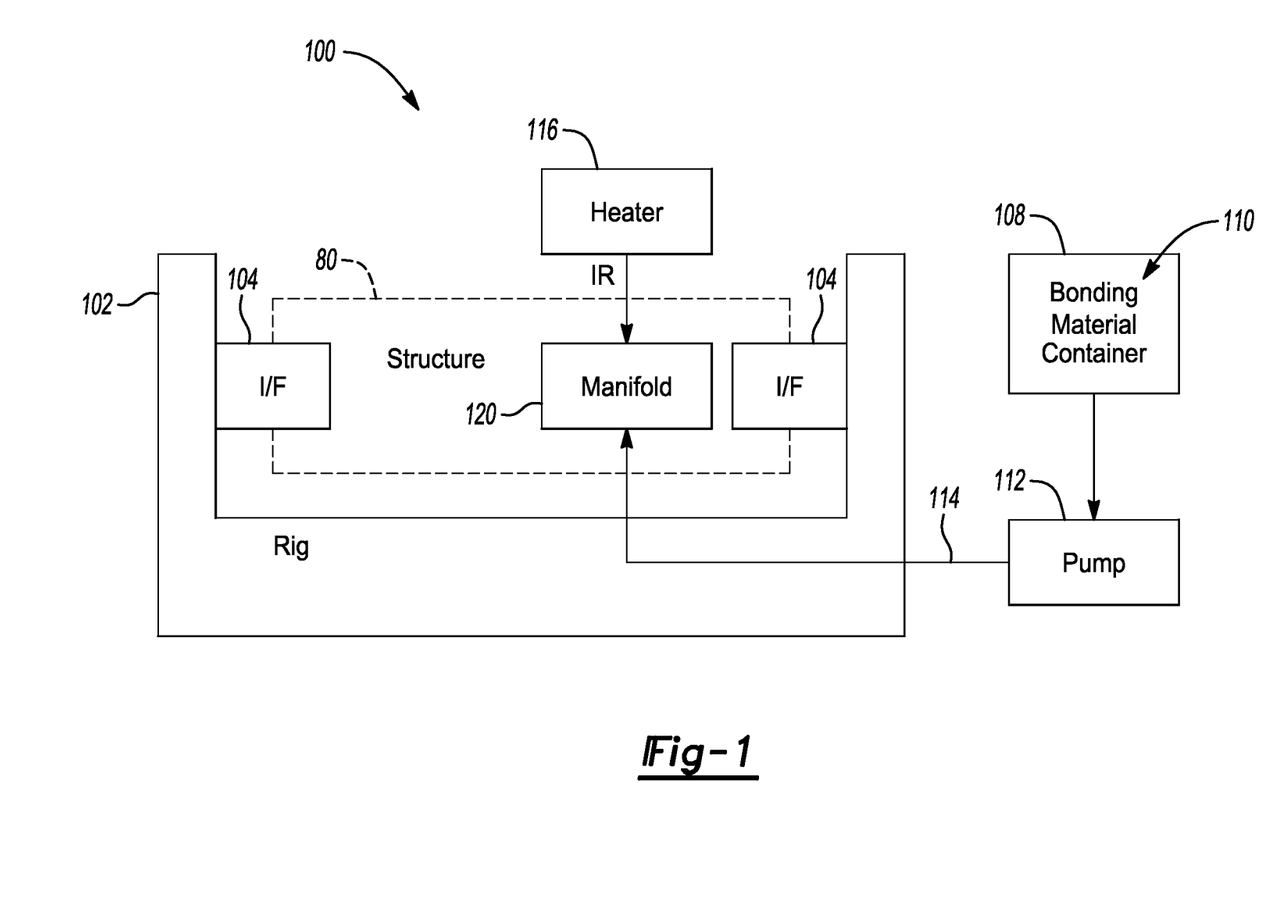
FIG. 1 is a schematic diagram of a repair system in accordance with one or more exemplary embodiments.

Referring to FIG. 1, a schematic diagram of an example implementation of a repair system 100 is shown in accordance with one or more exemplary embodiments. The repair system 100 is operational to repair a crack 82 (see FIG. 2) in a structure 80. The structure 80 may be a composite structure 80a and/or a bonded metal structure 80b.

The repair system 100 generally includes an optional rig 102, one or more optional interfaces 104, one or more optional grips 106 (see FIG. 2), a container 108, bonding material 110, a pump 112, a hose 114, a heater 116, one or more optional sensors 118, and a manifold 120. The heater 116 may generate an infrared light (IR) received by structure 80 through and around the manifold 120. The infrared light IR may have a wavelength and intensity to act as a warming light configured to heat the structure 80 to a predetermined temperature.

The rig 102 implements a load rig. Where utilized, the rig 102 is operational to hold the structure 80, and alternatively apply and remove a mechanical load to the structure 80 during the repair process. The mechanical load is configured to slightly open the crack 82 in the structure 80 making it easier for the bonding material 110 to enter the crack 82.

The interfaces 104 implement rigid arms used to couple the rig 102 to the structure 80. Where utilized, the interfaces 104 are operational to apply and remove the mechanical load to the structure 80 during the repair process. In various situations, the mechanical load may be a tension load, a shear load, a torsion load, and/or a bending load. Other types of mechanical loads may be applied to the structure 80 by the interfaces 104 to meet the design criteria of a particular application.

Figure 2:
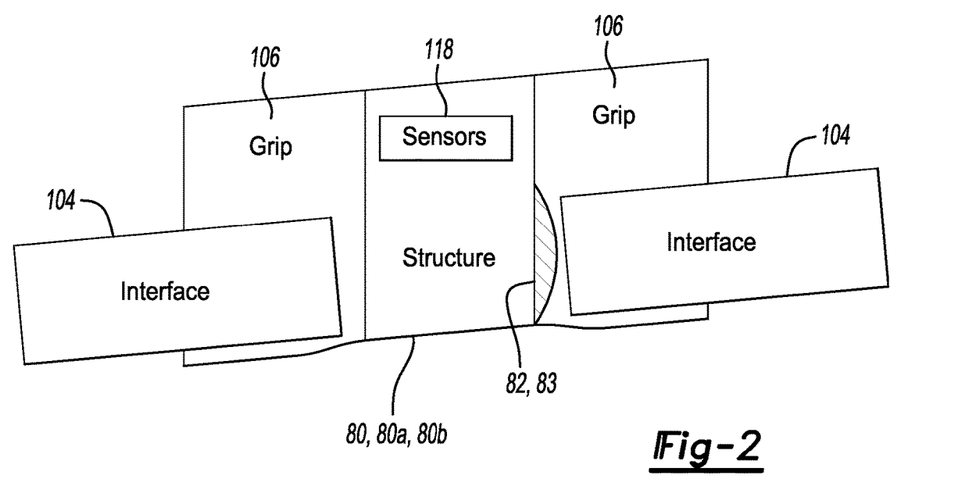
FIG. 2 is a partial perspective schematic diagram of a structure mounted for repair in accordance with one or more exemplary embodiments.

The grips 106 implement composite grips. Where utilized, the grips 106 are removably attachable to the structure 80 to add strength to the structure 80 during the repair process. The grips 106 provide an intermediate connection between the structure 80 and the interfaces 104. In various situations, the grips 106 may be eliminated and the interfaces 104 are removably attachable directly to the structure 80. In various embodiments, the rig 102, the interfaces 104, and/or the grips 106 may be eliminated where loading of the structure may be achieved by other mechanisms (e.g., adding fuel to an aircraft wing), or other situations where the loading is not appropriate.

The container 108 implements a storage container. The container 108 is in fluid communication with the pump 112. The container 108 is operational to store uncured bonding material 110. The uncured bonding material 110 is transferred from the container 108 to the pump 112 while the pump 112 is operational.

The bonding material 110 implements a flowable resin, laminating resin, or epoxy. A type of the bonding material 110 used in a repair is selectable based on the material of the structure 80. The bonding material 110 is operational to fill the crack 82 in the structure 80, harden (or cure), and prevent the crack 82 from expanding through the structure 80. By way of example, the bonding material 110 may be an EA9396 laminating resin, an EA9309.3NA paste adhesive, and EA9309.2NA paste adhesive, or an EA9394 Paste Adhesive, each available from Henkel Corp., Rocky Hill, Connecticut.

The pump 112 implements an adjustable pressure pump. The pump 112 is in fluid communication with the container 108 and the manifold 120. The pump 112 is operational to pressurize the bonding material 110 received from the container 108 to a controllable pressure. The controllable pressure may be at least three pressures: a first (or high) pressure suitable to force the bonding material 110 into the crack 82, a second (or medium) pressure suitable to press the bonding material 110 against the crack 82 as the crack 82 is closed, and a third (or low) pressure that allows the bonding material 110 to flow back out of the manifold 120. In various designs, the third pressure may be zero pressure or a negative pressure.

The hose 114 implements a pressure hose. The hose 114 is in fluid communication with the pump 112 at one end, and with the manifold 120 at the other end. The hose 114 is operational to transfer the bonding material 110 under pressure to the manifold 120.

The heater 116 implements an infrared heater. The heater 116 is operational to generate the infrared light IR used to warm the structure 80 during the repair process. In various embodiments, the infrared light IR generated by the heater 116 may be a mid-wavelength infrared light.

The sensors 118 implement one or more sensors suitable to measure parameters of the structure 80. The sensors 118 may include, but are not limited to, pressure sensors, strain sensors, torsion sensors, tension sensors, temperature sensors, and the like. In various situations, the sensors 118 are permanently attached to the structure 80. In other situations, the sensors 118 are temporarily attached to the structure 80. In either situation, the sensors 118 may remain attached to the structure 80 during the repair process. Therefore, calibrations associated with the placement and/or operation of the sensors 118 before the crack 82 forms may be left unchanged by the repair process.

The manifold 120 implements a flexible manifold designed to cover the crack 82. The manifold 120 is mountable to the structure 80. The manifold 120 is operational to provide an enclosed chamber around the crack 82. A channel in the manifold 120 directs the bonding material 110 from the hose 114 onto a surface of the structure 80 and into the crack 82 under pressure. The manifold 120 may benefit from a degree of flexibility such that the manifold 120 accommodates some flexing in the structure 80 due to loading and unloading, a degree of error in manufacturing of the manifold 120 itself, a degree of inaccuracy in the measurement of the structure 80, and/or errors in the manufacture of the structure 80 to be repaired.

To repair a crack 82, a surface contour (e.g., a planar surface, a curved surface, a saddle surface, a nonplanar surface, or an irregular surface) of the structure 80, and optionally a grip 106, surrounding the crack 82 is measured while the structure 80 remains in situ. From the measurements, the manifold 120 is fabricated. A grip surface of the manifold 120 is shaped to match the nonplanar surface contour of the structure 80 proximate the crack 82. The custom manifold 120 is subsequently mounted to the surface of the structure 80 around the crack 82 with an adhesive. Before or after the manifold 120 is mounted, the grips 106 and/or the interfaces 104 of the repair system 100 are coupled to the structure 80.

While the structure 80 is mounted in the repair system 100, the heater 116 warms the structure 80 with the infrared light IR prior to filling the channel in the manifold 120 with the bonding material 110. A mechanical load may be applied to the structure 80 by the interfaces 104 of the rig 102 to cause a slight opening (or expansion) of the crack 82. A vent port at one end of the manifold 120 is opened and the bonding material 110 is pumped into the channel of the manifold 120 through an injection port at the other end. The bonding material 110 is injected into the manifold 120 at the first pressure (e.g., 20 to 30 pounds per square inch (psi)). Once the manifold 120 is filled with the bonding material 110, the vent port is closed. From the channel, the pressurized bonding material 110 seeps into the crack 82. In various embodiments, a vacuum may be applied to the vent port to assist in drawing the bonding material 110 into the manifold 120.

The mechanical load applied to the structure 80 to open the crack 82 is reduced, thereby allowing the bonding-material-coated crack 82 to close. If appropriate, the mechanical load on the structure 80 may be reversed to force the crack 82 into the closed configuration. While or after the crack 82 closes, the pressure on the bonding material 110 in the manifold 120 may be reduced to the second pressure (e.g., 5 to 10 psi). The repair process includes a first waiting period to allow the bonding material 110 to begin to cure.

After the first waiting period has lapsed, the pressure on the bonding material 110 in the manifold 120 may be removed, the vent port opened, the bonding material 110 is removed from the manifold 120, and the infrared heat IR is reduced or removed.

A second waiting period of the repair process is provided for the structure 80 to cool back to near or at ambient temperature, and for the bonding material 110 left behind in the crack 82 to cure. Once the bonding material 110 has achieved a specified level of curing, the manifold 120 may be removed from the structure 80. Residues of the bonding material 110 and the adhesive may be subsequently cleaned. An inspection of the repair is performed, and if the inspection passes, the structure 80 is uncoupled from the repair system 100.

Referring to FIG. 2, a partial perspective schematic diagram of an example implementation of a structure 80 as mounted for repair is shown in accordance with one or more exemplary embodiments. The structure 80 may include the crack 82. The crack 82 may define a damaged area 83. In the embodiment illustrated, the damaged area 83 extends under the nearby grip 106. The illustration also includes the use of the rig 102 (see FIG. 1), the interfaces 104, and the grip 106.

The grips 106 are directly coupled to the structure 80 proximate to the damaged area 83. The grips 106 are configured to transfer the mechanical load received through the interfaces 104 to the structure 80. The mechanical load generally causes the crack 82 to expand slightly making reception of the bonding material 110 into the space more likely. The grips 106 are shaped and placed to avoid physical interference with the sensors 118 that are already connected to the structure 80.

The interfaces 104 are directly coupled to the grips 106, one interface 104 per grip 106. The interfaces 104 are configured to transfer the mechanical load generated by the rig 102 to the grips 106 and onto the structure 80. In various embodiments, the sensor 118 may be used to monitor the mechanical load being applied to the structure 80 by the grips 106 and the interfaces 104.

Figure 3:
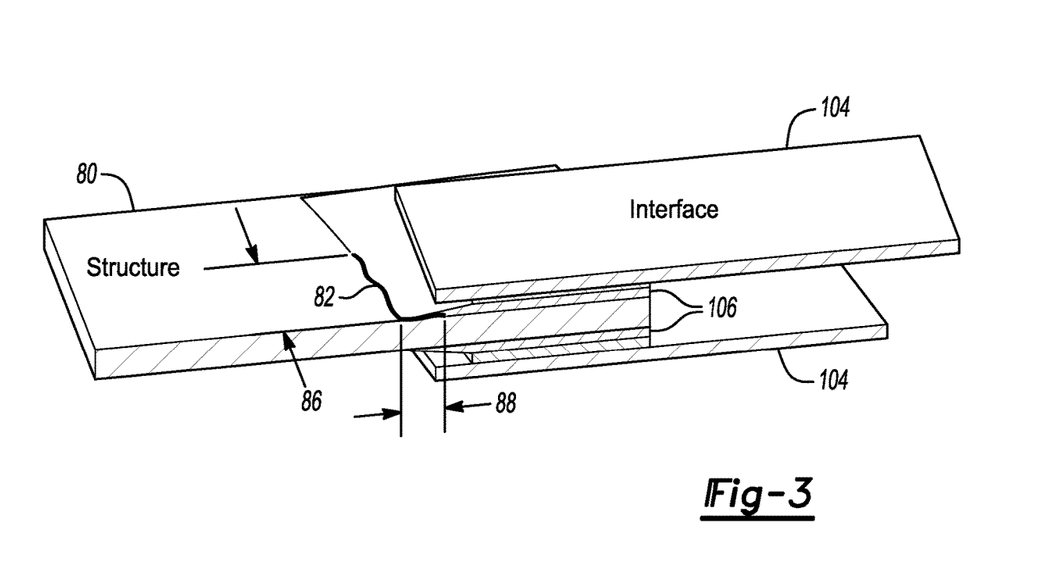
FIG. 3 is a partial perspective schematic diagram of a crack in the structure in accordance with one or more exemplary embodiments.

Referring to FIG. 3, a partial perspective schematic diagram of an example crack 82 in the structure 80 is shown in accordance with one or more exemplary embodiments. In the example illustrated, the crack 82 may be defined in terms of a first dimension 86 and a second dimension 88 while the rig 102 is not applying the mechanical load to the structure 80. In other examples, the crack 82 may be defined in three dimensions.

In various embodiments, the first dimension 86 of the crack 82 may range from a few millimeters to several centimeters (e.g., 100 cm). Some cracks 82 may have larger dimensions 86. The second dimension 88 of the crack 82 may also range from a few millimeters to several centimeters (e.g., 50 cm). Some cracks 82 may have larger dimensions 88.

Figure 4:
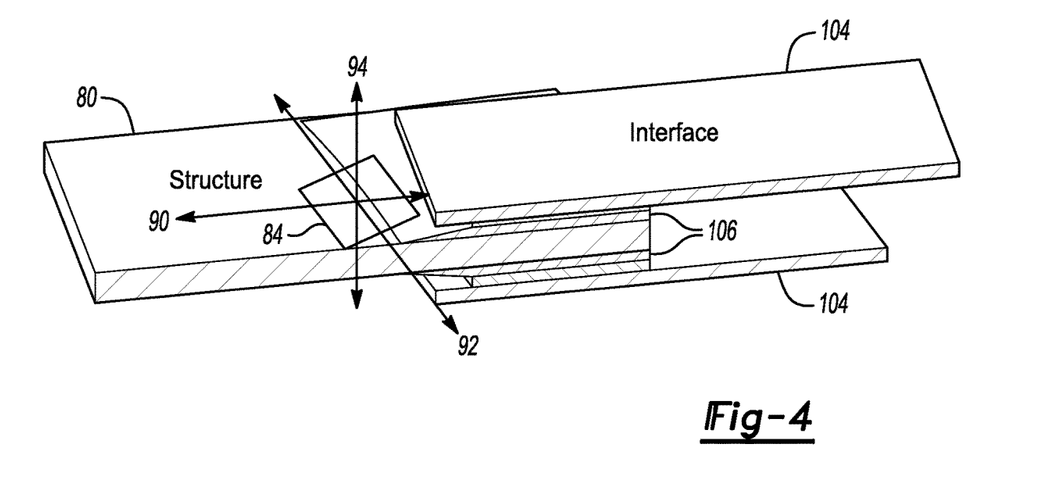
FIG. 4 is a partial perspective schematic diagram of a nonplanar surface contour of the structure proximate a damaged area in accordance with one or more exemplary embodiments.

Referring to FIG. 4, a partial perspective schematic diagram of an example nonplanar surface contour 84 of the structure 80 and the grip 106 proximate the damaged area 83 is shown in accordance with one or more exemplary embodiments. The nonplanar surface contour 84 may be defined along a first axis 90, a second axis 92, and a third axis 94. The axes 90, 92, and 94 may be orthogonal to each other. The manifold 120 is fabricated to match the contour of the nonplanar surface contour 84 to provide a tight seal between the manifold 120 and the structure 80/grip 106 that prevents leakage of the pressurized bonding material 110.

In complex situations, the nonplanar surface contour 84 may vary along each axis 90, 92, and 94. In simpler situations, the nonplanar surface contour 84 may vary along one or two axes 90, 92, and/or 94. In still other situations, the nonplanar surface contour 84 may vary along a single axis 90, 92, or 94. As illustrated, the nonplanar surface contour 84 varies along the first axis 90 due to a thickness of the (upper) grip 106.

Figure 5:
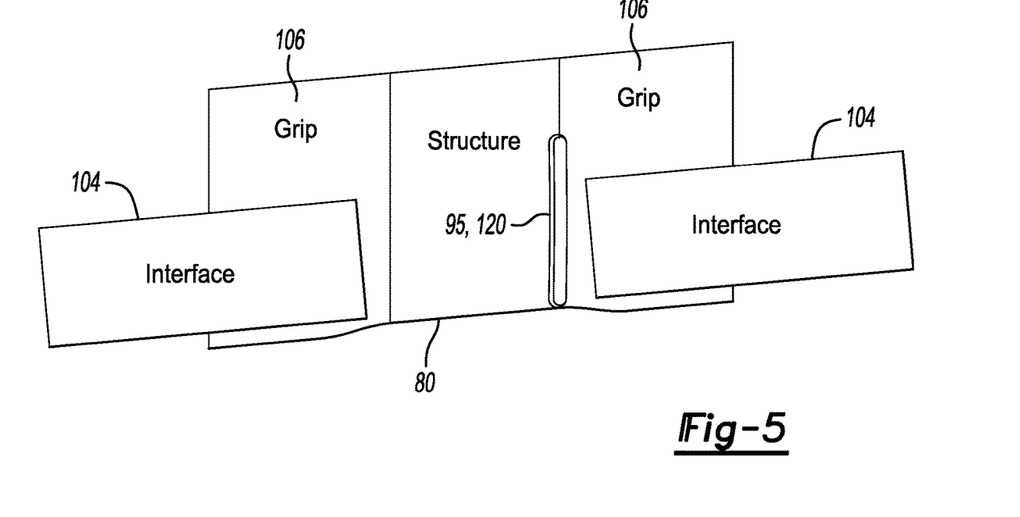
FIG. 5 is a partial perspective schematic diagram of a manifold mounted to the structure over the damaged area in accordance with one or more exemplary embodiments.

Referring to FIG. 5, a partial perspective schematic diagram of an example manifold 120 mounted to the structure 80 and the grip 106 over the damaged area 83 is shown in accordance with one or more exemplary embodiments. An open side of the manifold 120 may be fabricated to match the nonplanar surface contour 84 around an area 95 where the crack 82 is exposed at the external surface. In the illustration, the manifold 120 has an elongated (or rectangular) shape that spans a larger area than the exposed portion of the crack 82 (see FIG. 3). The shape of the open side of the manifold 120 (e.g., the side bonded to the structure 80 and the grip 106) may be determined by measuring the nonplanar surface contour 84 after the grip 106 has been installed. In various embodiments where the crack 82 does not extend under the grip 106, the shape of the open side of the manifold 120 may be determined by measuring the nonplanar surface contour 84 solely of the structure 80 before or after the grip 106 is installed.

Figure 6:
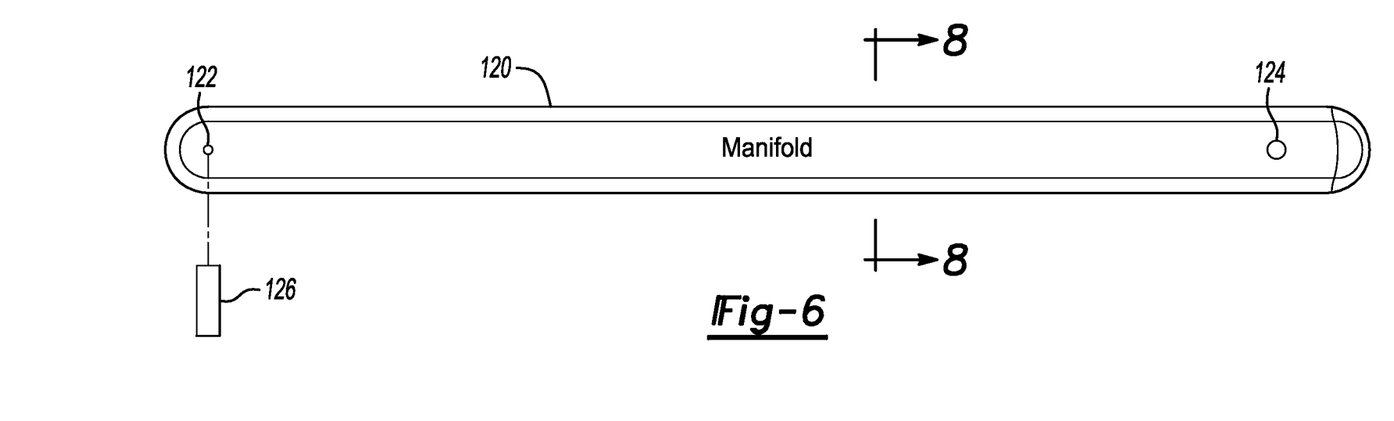
FIG. 6 is a schematic plan diagram of the manifold in accordance with one or more exemplary embodiments.

Referring to FIG. 6, a schematic plan diagram of an example implementation of the manifold 120 is shown in accordance with one or more exemplary embodiments. The manifold 120 generally includes a vent port 122, an injection port 124, and a plug 126. The plug 126 may be configured to alternatively open and close the vent port 122.

The vent port 122 implements a weep hole. While open, the vent port 122 allows air to escape as the manifold 120 is filled with the bonding material 110, and allows the air to enter while the bonding material 110 is being drained from the manifold 120. While closed, the vent port 122 retains the bonding material 110 inside the manifold while the bonding material 110 is under pressure.

The injection port 124 implements a port (or opening) suitable for injecting and draining the bonding material 110 into and out of the manifold 120. The injection port 124 is connectable to the hose 114 to receive the bonding material 110, and disconnectable from the hose 114 to allow the bonding material 110 to drain out of the manifold 120.

Figure 7:
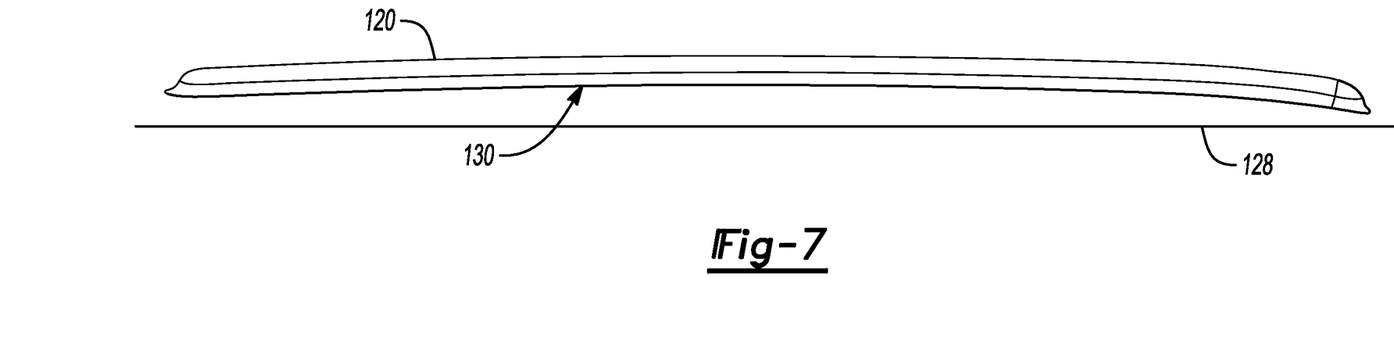
FIG. 7 is a side view schematic diagram of the manifold in accordance with one or more exemplary embodiments.

Referring to FIG. 7, a side view schematic diagram of an example implementation of the manifold 120 is shown in accordance with one or more exemplary embodiments. The manifold 120 generally has a customizable shape 130 on the side mounted to the structure 80. In some embodiments, the customizable shape 130 is nonparallel to a planar surface 128. The customizable shape 130 is based on the measurements made of the nonplanar surface contour 84. In other embodiments, the customizable shape 130 may be parallel to the planar surface 128 where the structure 80 around the crack 82 is a flat surface. Other customizable shapes 130 may be implemented to meet a design criteria of a particular application.

Figure 8:
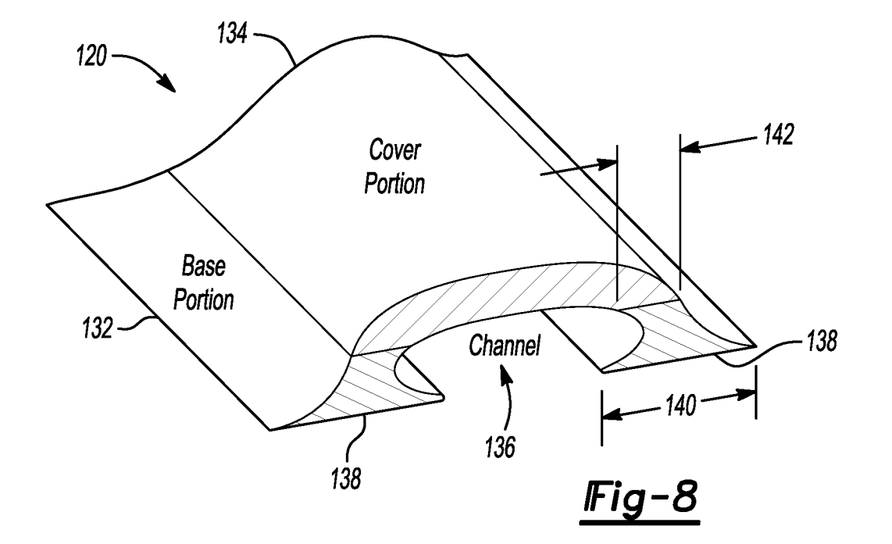
FIG. 8 is a cross-sectional perspective view of a cross-section A-A of the manifold in accordance with one or more exemplary embodiments.

Referring to FIG. 8, a cross-sectional perspective view of an example cross-section A-A (see FIG. 6) of the manifold 120 is shown in accordance with one or more exemplary embodiments. The manifold 120 generally includes a base portion 132, and a cover portion 134. The base portion 132 and the cover portion 134 generally define a channel 136.

The base portion 132 implements a soft (e.g., rubber base) lower section of the manifold 120. The base portion 132 has a cross-sectional design allows the manifold 120 to adhere to the structure 80 and remain in place during application of pressure to the bonding material 110 inside the manifold

120. The base portion 132 includes a grip surface 138 that may be bonded to the structure 80 and optionally to a grip 106.

The cover portion 134 implements a clear plastic upper section of the manifold 120. The cover portion 134 includes the vent port 122 and the injection port 124. The clear cover portion 134 is designed to be transparent to the infrared light IR generated by the heater 116. The infrared light IR generally passes through the manifold 120 and reach the structure 80 and the grip 106. The clear cover portion 134 is also designed to be transparent to visible light (VIS) (see FIG. 9). The visible light VIS passes through the cover portion 134 to allow a repair team to see the bonding material 110 entering and filling the channel 136.

The channel 136 implements a lower opening in the manifold 120. The channel 136 is in fluid communication with the crack 82 while the manifold 120 is mounted to the structure 80. The channel 136 is operational to transfer the bonding material 110 from the injection port 124 in the manifold 120 to the crack 82 in the structure 80.

The grip surface 138 implements a flexible surface of the base portion 132 that matches the nonplanar surface contour 84. The grip surface 138 is bonded to the structure 80 and the grip 106 using a sealant. In various embodiments, the sealant may be a BMS5-44 sealant, available from PPG Aerospace, Huntsville, Alabama. Other sealants may be utilized to meet a design criteria of a particular application. A perimeter of the grip surface 138 generally has a grip surface width 140 that is wider than a base-cover interface width 142, where the base portion 132 mates with the cover portion 134. The relatively larger grip surface width 140 provide for good sealing between the manifold 120 and the structure 80/grip 106.

Figure 9:
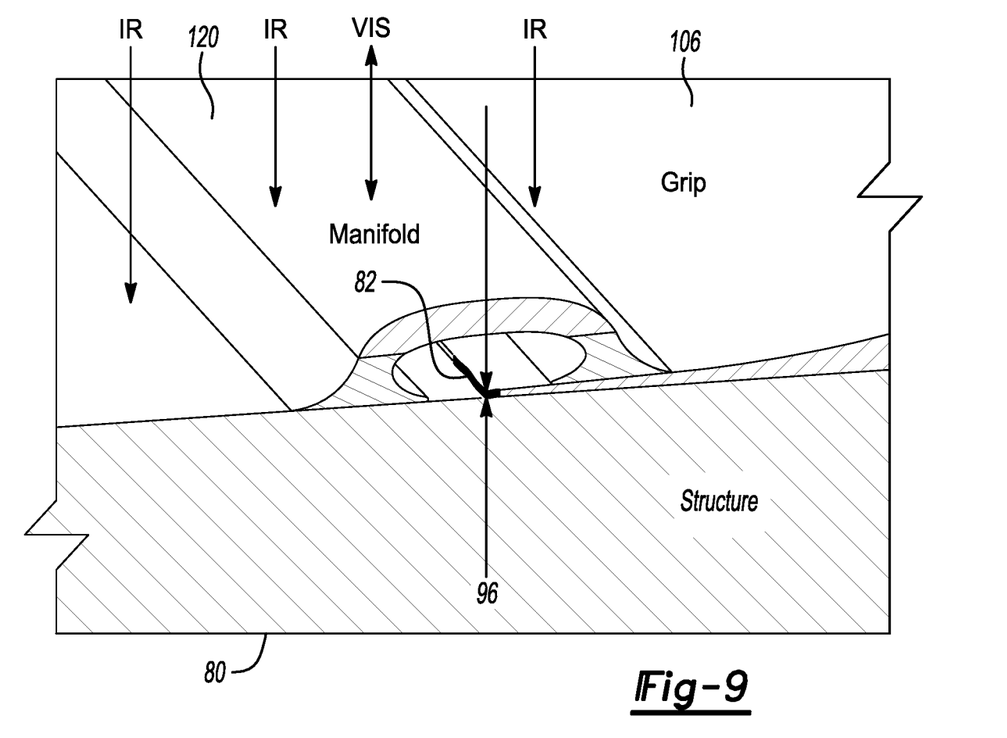
FIG. 9 is a cross-sectional perspective view during a warming of the structure in accordance with one or more exemplary embodiments.

Referring to FIG. 9, a cross-sectional perspective view of an example warming of the structure 80 is shown in accordance with one or more exemplary embodiments. Before bonding the manifold 120 to the structure 80/grip 106, the grip surface 138 of the manifold 120, the corresponding surface of the structure 80, and the corresponding surface of the grip 106 are prepared for bonding with each other. With the manifold 120 bonded to the structure 80/grip 106 and the crack 82 is generally closed (e.g., illustrated as a first separation 96 between the structure 80 and the grip 106), the infrared light IR may be directed onto the structure 80/grip 106. Some infrared light IR may reach the structure 80 and the grip 106 away from the manifold 120. Other infrared light IR may pass through the clear cover portion 134 and reach the structure 80/grip 106 covered by the manifold 120. The visible light VIS may pass through the cover portion 134 of the manifold 120 to enable viewing of the bonding material 110 in the channel 136.

Figure 10:
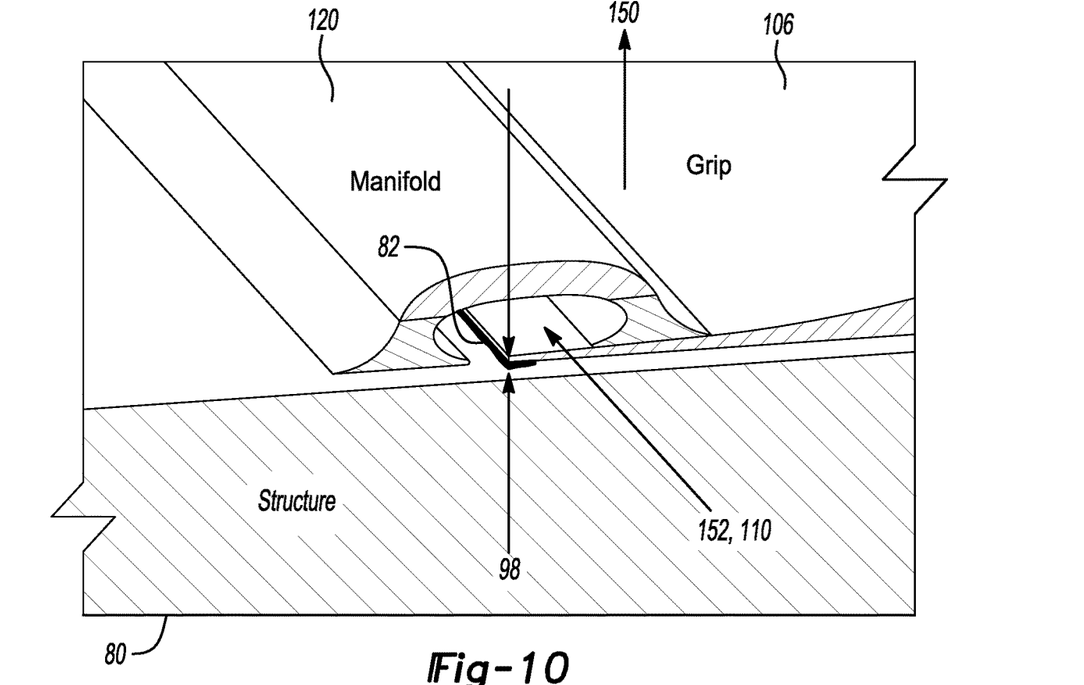
FIG. 10 is a cross-sectional perspective view during a loading of the structure in accordance with one or more exemplary embodiments.

Referring to FIG. 10, a cross-sectional perspective view of an example loading of the structure 80 is shown in accordance with one or more exemplary embodiments. Once the structure 80/grip 106 have been sufficiently warmed, the rig 102 may apply a mechanical load 150 to the structure 80/grip 106 that causes the crack 82 to open (e.g., increase in separation) to a second dimension 88. The second dimension 88 (e.g., the crack 82 is open) is large than the first dimension 86 (e.g., the crack 82 is closed). The bonding material 110 may be injected into the manifold 120 at the first pressure 152. The first pressure forces the bonding material 110 into the crack 82 and onto the surrounding surfaces of the structure 80 and the grip 106. After the manifold 120 has been filled with the bonding material 110 at the first pressure 152, the vent port 122 may be closed with the plug 126.

Figure 11:
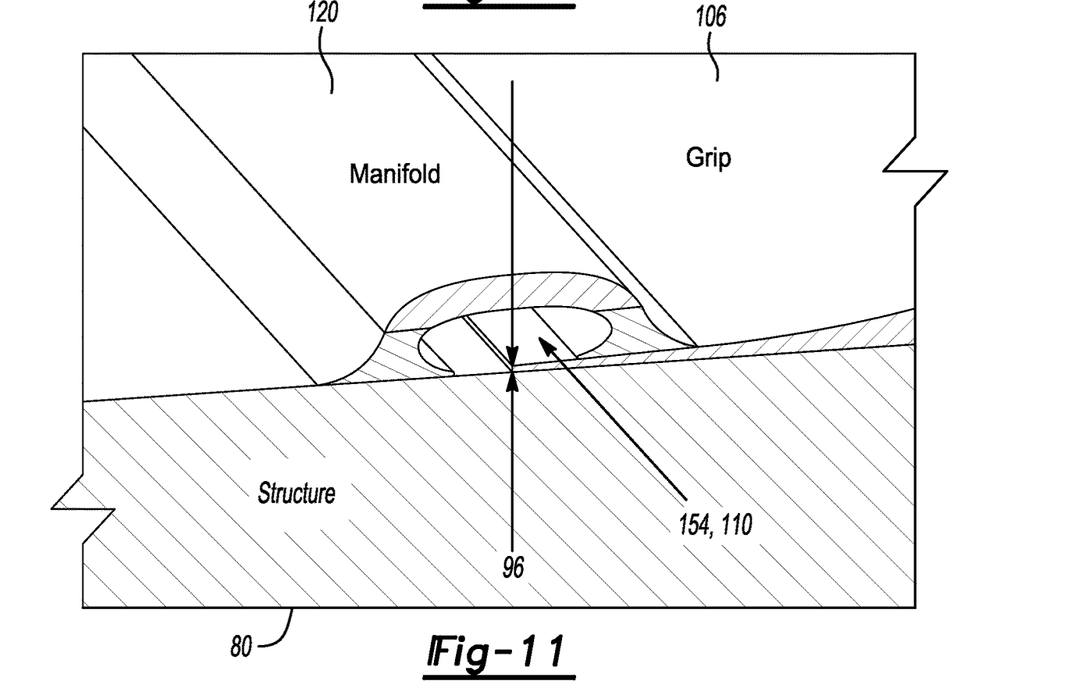
FIG. 11 is a cross-sectional perspective view during an unloading of the structure in accordance with one or more exemplary embodiments.

Referring to FIG. 11, a cross-sectional perspective view of an example unloading of the structure 80 is shown in accordance with one or more exemplary embodiments. Once the manifold 120 and the crack 82 have been filled with the bonding material 110, the mechanical load 150 may be removed by the rig 102 slowly to close the crack 82, and the pressure of the bonding material 110 inside the manifold may be reduced to a second pressure 154. Reducing the mechanical load 150 generally causes the crack 82 to close to the first separation 96 (e.g., approximately zero distance). Thereafter, the pressure of the bonding material 110 in the manifold 120 may be maintained at the second pressure 154 as the bonding material 110 begins to cure and strengthen the damaged area 83 of the structure 80.

Figure 12:
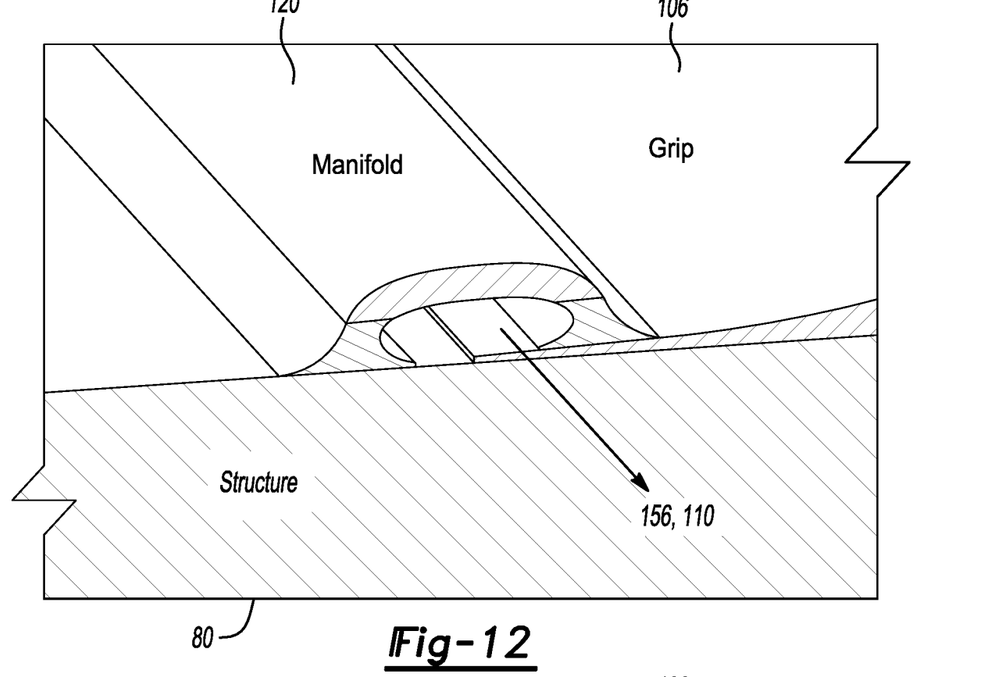
FIG. 12 is a cross-sectional perspective view during a draining of a bonding material in accordance with one or more exemplary embodiments.

Referring to FIG. 12, a cross-sectional perspective view of an example draining of the bonding material 110 is shown in accordance with one or more exemplary embodiments. After the bonding material 110 has achieved a predetermined level of curing in the crack 82 (e.g., after a predetermined amount of time based on the temperature), the bonding material 110 may be removed 156 from the manifold 120. The removal 156 generally include removing the plug 126 to open the vent port 122, and allowing the bonding material 110 to drain out through the injection port 124. After the remaining bonding material 110 has been drained, the structure 80/grip 106 are allowed to cool and the bonding material 110 is allowed to cure fully.

Figure 13:
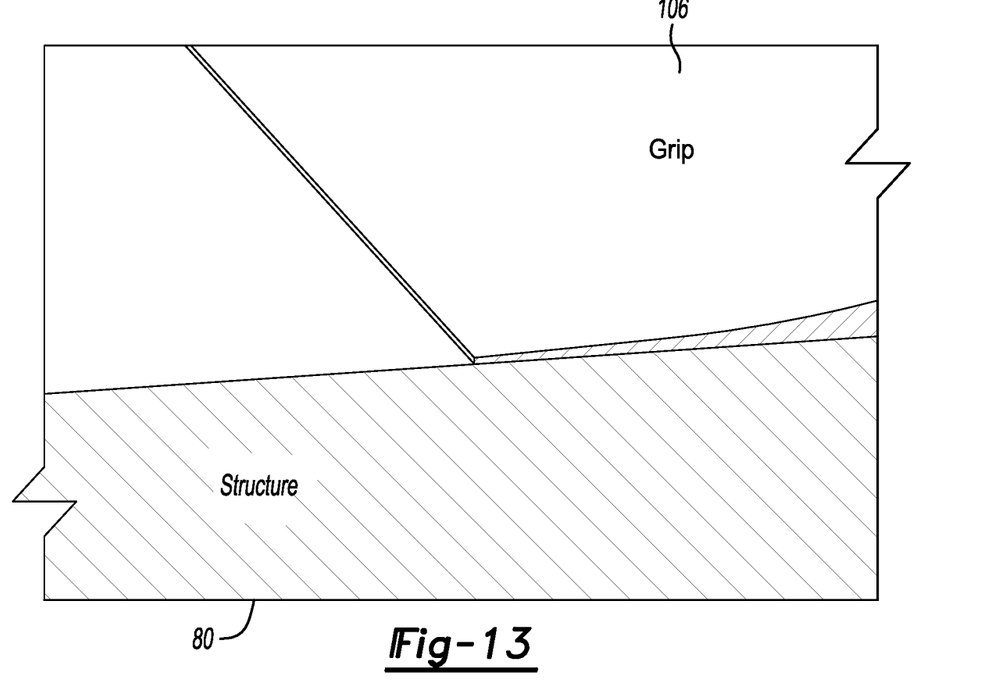
FIG. 13 is a cross-sectional perspective view diagram of a repaired structure in accordance with one or more exemplary embodiments.

Referring to FIG. 13, a cross-sectional perspective view of an example repaired structure 80 is shown in accordance with one or more exemplary embodiments. After the bonding material 110 has reached a sufficient level of cured strength, the manifold 120 may be removed from the structure 80/grip 106. After the bonding material 110 has fully cured, residues of the bonding material 110 and/or the adhesive left on the surface of the structure 80 are removed by clearing (e.g., dissolving with a solvent and/or sanding).

Figure 14:
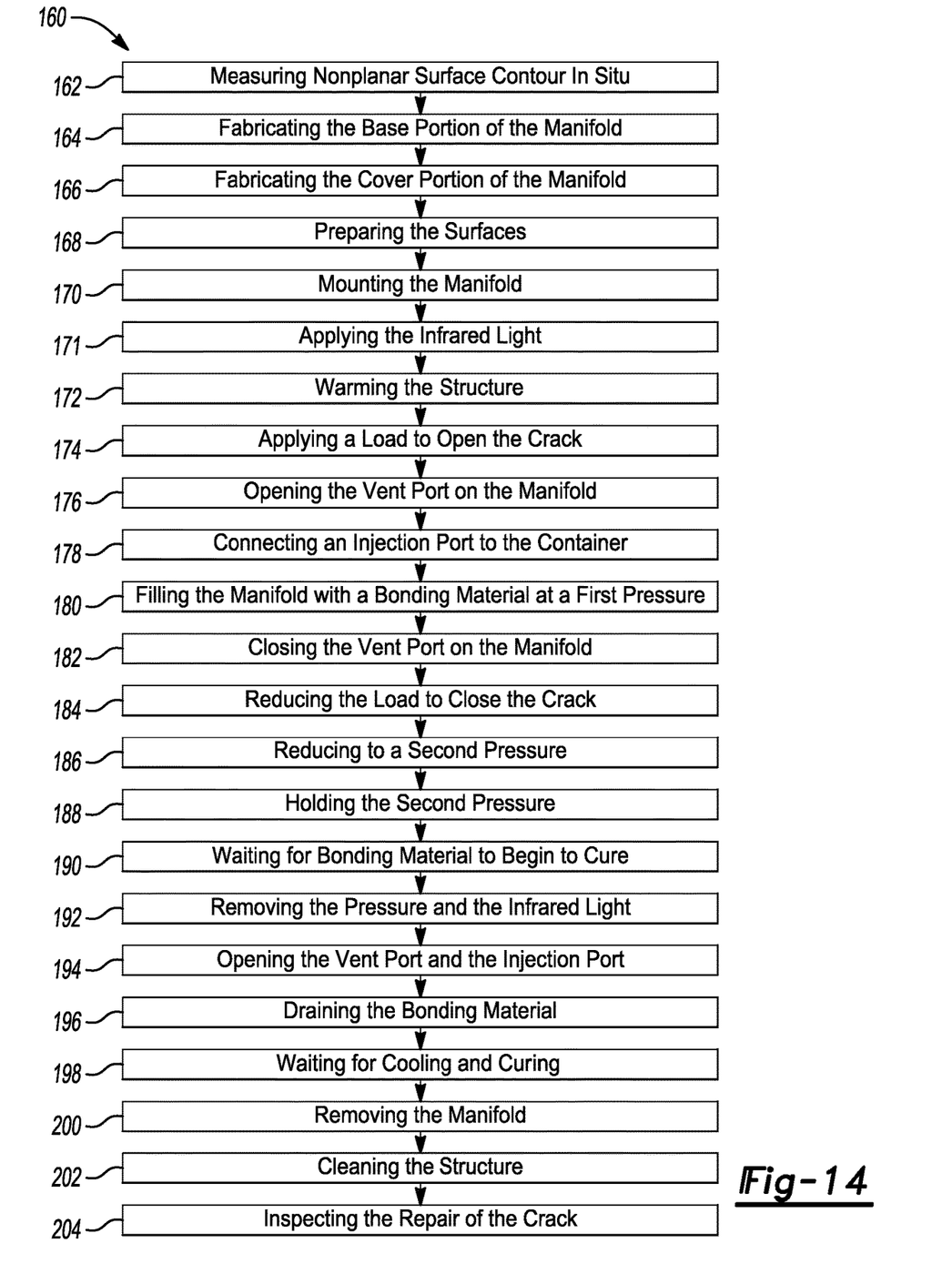
FIG. 14 is a flow diagram of a method for repairing the crack in the structure in accordance with one or more exemplary embodiments.

Referring to FIG. 14, a flow diagram of an example implementation of a method 160 for repairing the crack 82 in the structure 80 is shown in accordance with one or more exemplary embodiments. The method (or process) 160 is implemented by the repair system 100. The method 160 generally includes steps 162 to 204, described below. The sequence of steps is shown as a representative example. Other step orders may be implemented to meet the criteria of a particular application.

In the step 162, the nonplanar surface contour 84 that surrounds the crack 82 may be measured while the structure 80 remains in situ. Based on the measurements, the base portion 132 of the manifold 120 is fabricated in the step 164. An example fabrication technique may be a three-dimensional printing to recreate the measured shape. A shape of the resulting grip surfaces 138 generally matches the nonplanar surface contour 84 of the structure 80/grip 106. In the step 166, the cover portion 134 of the manifold 120 may be fabricated on the base portion 132. Other fabrication techniques may be implemented to meet a design criteria of a particular application.

A surface of the structure 80, the grip 106, and the grip surface 138 of the manifold 120 may be prepared for bonding in the step 168. The manifold 120 is mounted in the step 170 to the structure 80/grip 106 around and thereby enclosing the crack 82. The mounting 170 may include applying pressure to fully seat the manifold 120, and allow the sealant to cure. With the structure 80 in a position (e.g., supported or held by the rig 102, where appropriate) for performing the repair, the heater 116 is subsequently activated in the step 171 to apply the infrared light IR. The infrared light IR warms the structure 80/grip 106 around the crack 82 in the step 172. The infrared light IR shines through and around the manifold 120.

In the step 174, the rig 102 may apply the mechanical load 150 (see FIG. 10) to the structure 80/grip 106 to cause the crack 82 to expand and open in preparation for receiving the bonding material 110. If not performed earlier, the vent port 122 of the manifold 120 is opened in the step 176 to allow air to escape from the channel 136 as the bonding material 110 occupies the channel 136. The injection port 124 is connected to the container 108 (via the pump 112 and the hose 114) in the step 178 to receive the bonding material 110.

In the step 180, the channel 136 of the manifold 120 is filled with the bonding material 110 under pressure created by the pump 112. When the channel 136 has been approximately filled with the bonding material 110, the vent port 122 is closed in the step 182 to contain the bonding material 110. When the vent port 122 is closed, the mechanical load 150 imposed by the rig 102 (if any) is reduced in the step 184, and the pressure of the bonding material 110 in the channel 136 is reduced (or lowered) to the second pressure 154 in the step 186. The bonding material 110 in the channel 136 is held at the second pressure in the step 188 for a predetermined time. The predetermined time generally holds the bonding material 110 in the channel 136 to the bonding material 110 to reach deep into the crack 82 and begin to cure in the step 190.

In the step 192, after the predetermined time has elapsed, the pressure on the bonding material 110 is removed and the infrared light IR is reduced or eliminated. The vent port 122 and the injection port 124 are opened in the step 194. The bonding material 110 remaining in the channel 136 subsequently drains from the manifold 120 in the step 196. Another predetermined waiting period is encountered in the step 198 to allow the previously-warmed structure 80/grip 106 to cool and the bonding material 110 to continue to cure.

In the step 200, after the waiting period is over, the manifold 120 is removed from the structure 80/grip 106. The structure 80 and the grip 106 are cleaned in the step 202 to remove residues left behind. The repair is inspected in the step 204 to determine if successful or if additional repairs are appropriate.

Figures 15, 16, 17:
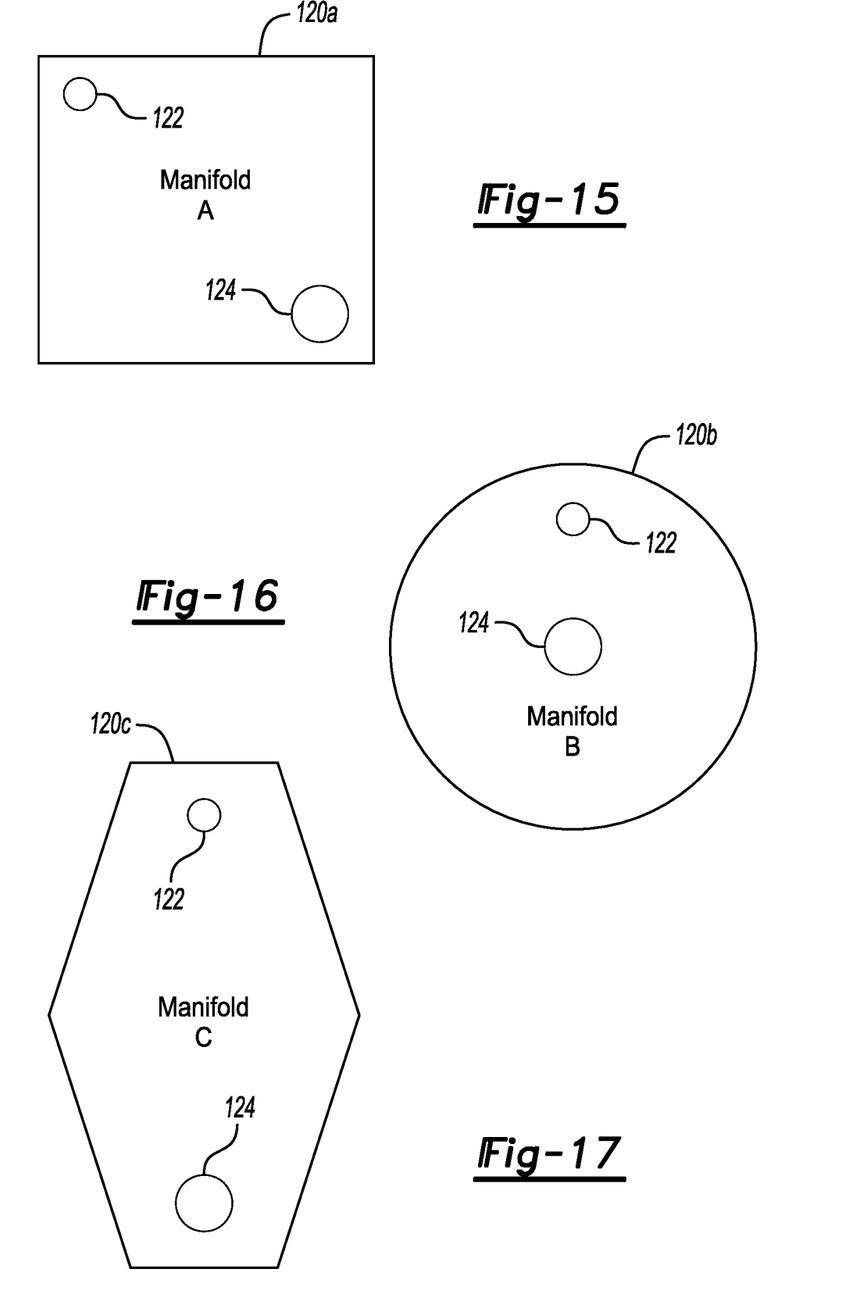
FIG. 15 is a schematic plan diagram of another manifold shape in accordance with one or more exemplary embodiments.
FIG. 16 is a schematic plan diagram of still another manifold shape in accordance with one or more exemplary embodiments.
FIG. 17 is a schematic plan diagram of yet another manifold shape in accordance with one or more exemplary embodiments.

Referring to FIG. 15, a schematic plan diagram of an example implementation of another manifold shape is shown in accordance with one or more exemplary embodiments. A manifold 120a may be implemented with a generally square shape. The manifold 120a may be a variation of the manifold 120. The manifold 120a includes the vent port 122 and the injection port 124.

Referring to FIG. 16, a schematic plan diagram of an example implementation of still another manifold shape is shown in accordance with one or more exemplary embodiments. A manifold 120b may be implemented with a generally circular shape. The manifold 120b may be a variation of the manifold 120 and/or the manifold 120a. The manifold 120b includes the vent port 122 and the injection port 124.

Referring to FIG. 17, a schematic plan diagram of an example implementation of yet another manifold shape is shown in accordance with one or more exemplary embodiments. A manifold 120c may be implemented with a generally hexagonal shape. The manifold 120c may be a variation of the manifold 120, the manifold 120a and/or the manifold 120b. The manifold 120c includes the vent port 122 and the injection port 124.

The manifold 120 is designed to adhere to the surface of the structure 80 and remain sealed, even under the application of loading to open and close the crack 82 repeatedly, and allow the bonding material 110 to flow into the damage. The manifold 120 features an opening in the base portion 132 that matches the measured crack 82, a compliant grip surface 138, and a clear window in the cover portion 134 to allow an operator to monitor the repair process. After the manifold 120 is fabricated, the repair process is summarized as follows. Other shapes and/or sizes of the manifolds 120 may be implemented to meet a design criteria of a particular repair application.

Mask a perimeter of the manifold 120 onto the damaged area 83. Abrade and clean the surface of the structure 80 in the damaged area 83. Mask the cracked area, leaving at least approximately 0.020 inches to 0.050 inches accessible on both sides of the crack 82. Dry-fit the manifold 120 to the structure 80/grip 106 and adjust as appropriate. Bond the manifold 120 to the damaged structure 80/grip 106 using a sealant. Apply pressure to fully seat the manifold 120, and allow the sealant to cure. Heat the applicable area 95 using the heater 116. Prepare the bonding material 110 of choice, and transfer the prepared bonding material 110 into the container 108. Force (or pump) the bonding material 110 under pressure into the channel 136 of the manifold 120 via the injection port 124. Apply one or more mechanical loads 150 to open/close the crack 82 and allow the bonding material 110 to flow into the crack 82. Allow the repaired structure 80 to cool. Finish curing the bonding material 110 at room-temperature or elevated temperature to accelerate. Remove the manifold 120 and the bonding material/adhesive residues.

The repair process (e.g., the method 160) generally allows structural repairs to be performed in situ. An advantage of performing the repairs in situ includes not taking the damaged structure (or components) 80 apart, and subsequently reassembly the structures 80 after repairs are completed. Another advantage is that instrumentation involved with the structures 80 remain calibrated, installed, and tuned. Once the bonding material 110 has fully cured, the structures 80 are ready to return to regular operations without any additional steps. Another benefit of the manifold 120 is the ability to inject the bonding material 110 under pressure to provide a desired coverage, while allowing the manifold 120 to be removed from the surface after the cure, thus keeping the overall configuration of the asset the same. Another benefit is that the repair process is able to transfer the bonding material 110 under pressure, even as the crack 82 in the structure 80 is flexed open and closed under the one or more applied mechanical loads 150. The pressurized transfer allows the bonding material 110 to permeate more readily into the crack 82 to restore more of the structural capability.

The cross-section of the manifold 120 aids in the repair process. The base portion 132 of the manifold 120 may be made out of soft rubber to allow the manifold 120 to form a better seal against the corresponding mating structure. The shape of the base portion 132 is designed to stretch under the application of pressure and the mechanical load(s) 150 to prevent the manifold 120 from dis-bonding from the mating structure. The base portion 132 also features a lower opening (or window) that may be customized based on the actual damage present on the mating structure. The cover portion 134 of the manifold 120 may be made of a soft, clear plastic. The cover portion 134 of the manifold 120 allows the operators to see what was happening as the bonding material 110 fills the channel 136 and flows into (onto) the damaged areas of the mating structure. These features may be easily adapted to other composite parts, different types of structural damage, and/or other laminating resins. The cross-section of the manifold 120 may accommodate a wide range of viscosities of the bonding material 110.

The manifold 120 may be used to repair build nonconformances where problems are encounter during static testing and fatigue bench testing. The repair process is adaptable to perform repairs on composite rotor blades, fuel tanks, sandwich structure, metal-to-composite joints, and/or other composite parts with complex curvatures. The repair process may also be used to support aircraft-on-ground situations. The repair system 100 enables repair of large, complicated composite and/or bonded metal structures with internal cores, metal-to-composite joints, multi-materials, internal features, and/or surrounding permanent hardware in situ with significantly reduced manufacturing risk. Embodiments of the present disclosure work-around constraints such as unknown depth and unknown propagation of the damage, the inability to establish a proper vacuum seal, and the structural impacts of traditional drill-and-fill holes, that prevented routine composite repair methods from being used successfully.

The repair system 100 may be applied to aircraft. During pre-production, an aircraft production and service methodology may include specification and design of the aircraft and material procurement. During production, component and subassembly manufacturing is performed and system integration of the aircraft takes place. Thereafter, the aircraft may go through certification and delivery in order to be placed in service. While in service by a customer, the aircraft is scheduled for routine work in maintenance and service (that may also include modification, reconfiguration, refurbishment, and so on). Apparatus and methods embodied herein may be employed during one or more suitable stages of the production and service and/or suitable component of aircraft (e.g., an airframe, systems, an interior, a propulsion system, an electrical system, a hydraulic system, and an environmental system). Each process of may be performed or carried out by a system integrator, a third party, and/or an operator (e.g., a customer). For the purposes of this description, a system integrator may include without limitation a number of aircraft manufacturers and major-system subcontractors; a third party may include without limitation a number of vendors, subcontractors, and suppliers; and an operator may be an airline, a leasing company, a military entity, a service organization, and so on.

The aircraft includes an airframe with a plurality of systems and an interior. Examples of the systems include one or more of a propulsion system, an electrical system, electro-mechanical elements, a hydraulic system, and an environmental system. Numbers of other systems may be included. Although an aerospace example is shown, the principles of the disclosure may be applied to other industries, such as the automotive industry.

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A repair system comprising:
   a rig configured to support a structure that has a crack, wherein the structure has a nonplanar surface contour that surrounds the crack;
   a manifold mountable to the structure around the crack, wherein:
      the manifold has a base portion, a cover portion, and a plug;
      the base portion has a grip surface configured to conform to the nonplanar surface contour of the structure that surrounds the crack, the base portion defines a channel, and the channel is in fluid communication with the crack while the base portion is mounted to the structure;
      the cover portion is connected to the base portion and covers the channel, the cover portion has an injection port and a vent port that are in fluid communication with the channel, and the injection port is configured to transfer a bonding material alternatively into the channel and out of the channel; and
      the plug is configured to alternatively close and open the vent port; and
   a container in fluid communication with the injection port and configured to transfer the bonding material into the channel.

2. The repair system according to claim 1, further comprising:
   a heater configured to warm an area of the structure around the crack prior to filling the channel with the bonding material.

3. The repair system according to claim 1, further comprising:
   one or more arms attached to the structure and removably attachable to the structure.

4. The repair system according to claim 3, wherein the one or more arms are configured to apply a mechanical load to the structure to open the crack.

5. The repair system according to claim 4, further comprising:

a pump in fluid communication with the container and configured to fill the channel through the injection port with the bonding material while the crack is open.

6. The repair system according to claim 5, wherein the one or more arms are further configured to reduce the mechanical load on the structure to close the crack after the bonding material has filled the channel.

7. The repair system according to claim 6, wherein the bonding material is drained from the manifold through the injection port after the crack has been closed.

8. The repair system according to claim 1, further comprising:
one or more arms attached to the rig; and
one or more grips disposed between the one or more arm and the structure, and removably attachable to the structure.

9. The repair system according to claim 1, further comprising:
a sensor configured to measure a parameter of the structure during the repair.

10. A manifold to repair a crack in a structure that has a nonplanar surface contour that surrounds the crack, the manifold comprising:
a base portion that has a grip surface configured to conform to the nonplanar surface contour of the structure that surrounds the crack, wherein the base portion defines a channel, and the channel is in fluid communication with the crack while the base portion is mounted to the structure; and
a cover portion that is connected to the base portion and covers the channel, wherein the cover portion has an injection port and a vent port that are in fluid communication with the channel, the injection port is couplable to a container, and the injection port is configured to transfer a bonding material alternatively into the channel from the container and out of the channel.

11. The manifold according to claim 10, further comprising:
a plug configured to open the vent port to pass air out of the channel as the channel is filled with the bonding material.

12. The manifold according to claim 11, wherein the plug is further configured to close the vent port while the bonding material in the channel is under pressure.

13. The manifold according to claim 10, wherein the cover portion is transparent to infrared light that warms an area of the structure around the crack prior to filling the channel with the bonding material.

14. The manifold according to claim 13, wherein the cover portion is transparent to visible light.

15. The manifold according to claim 10, wherein the base portion is wider at the grip surface than at the cover portion.

16. The manifold according to claim 10, wherein the manifold is one of a square manifold, a circular manifold, or a hexagonal manifold.

17. A repair system comprising:
a rig configured to support a structure that has a crack, wherein the structure has a nonplanar surface contour that surrounds the crack;
a manifold mountable to the structure around the crack, wherein
the manifold has a base portion, a cover portion, and a plug,
the base portion has a grip surface configured to conform to the nonplanar surface contour of the structure that surrounds the crack, the base portion defines a channel, and the channel is in fluid communication with the crack while the base portion is mounted to the structure,
the cover portion is connected to the base portion and covers the channel, the cover portion has an injection port and a vent port that are in fluid communication with the channel, and the injection port is configured to transfer a bonding material alternatively into the channel and out of the channel, and
the plug is configured to alternatively close and open the vent port; and
a heater configured to warm an area of the structure around the crack prior to filling the channel with the bonding material.

18. The repair system according to claim 17, further comprising:
one or more arms attached to the structure and removably attachable to the structure.

19. The repair system according to claim 18, wherein the one or more arms are configured to apply a mechanical load to the structure to open the crack.

20. The repair system according to claim 19, further comprising:
a pump in fluid communication with the injection port and configured to fill the channel in the manifold with the bonding material while the crack is open.

* * * * *